US011203720B2

(12) United States Patent
Hareland et al.

(10) Patent No.: US 11,203,720 B2
(45) Date of Patent: Dec. 21, 2021

(54) TUBE ARRANGEMENT AND FURNACE

(71) Applicant: SANDVIK INTELLECTUAL PROPERTY AB, Sandviken (SE)

(72) Inventors: Mathias Hareland, Sandviken (SE); Peter Nordin, Sandviken (SE); Thomas Blomfeldt, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 285 days.

(21) Appl. No.: 16/470,648

(22) PCT Filed: Dec. 18, 2017

(86) PCT No.: PCT/EP2017/083409
§ 371 (c)(1),
(2) Date: Jun. 18, 2019

(87) PCT Pub. No.: WO2018/114866
PCT Pub. Date: Jun. 28, 2018

(65) Prior Publication Data
US 2020/0087580 A1     Mar. 19, 2020

(30) Foreign Application Priority Data

Dec. 20, 2016    (EP) .................................... 16205354

(51) Int. Cl.
*F16L 15/08*        (2006.01)
*C10G 9/20*         (2006.01)
(Continued)

(52) U.S. Cl.
CPC ................ *C10G 9/20* (2013.01); *F16L 13/04* (2013.01); *F16L 15/08* (2013.01); *F27D 2009/0002* (2013.01); *F27D 2009/0024* (2013.01)

(58) Field of Classification Search
CPC ... F16L 15/08; F16L 13/0218; F16L 13/0236; F16L 13/04; F16L 13/06; C10G 9/20
(Continued)

(56) References Cited

U.S. PATENT DOCUMENTS 1,935,041 A * 11/1933 Armacost ............... F16L 13/06
                                                        29/890.14
1,975,495 A * 10/1934 Armacost ........... F16L 13/0236
                                                         228/125
(Continued)

FOREIGN PATENT DOCUMENTS

FR          679867 A   *  4/1930  .............. F16L 13/04
FR          707905 A   *  7/1931  .............. F16L 13/06
(Continued)

OTHER PUBLICATIONS

International Search Report and Written Opinion dated Feb. 21, 2018, issued in corresponding International Patent Application No. PCT/EP2017/083409.

*Primary Examiner* — David Bochna
(74) *Attorney, Agent, or Firm* — Morgan, Lewis & Bockius LLP (57) ABSTRACT

A tube arrangement comprising a first metal tube, a second metal tube, a first sleeve part, and a second sleeve part. The first and second sleeve parts are threadedly connected to the first and second metal tubes. The first and second metal tubes are configured to be joined via a butt weld joint. The first sleeve and the second sleeve are configured to be joined via a second butt weld joint. The first sleeve part comprises a first outer surface extending at a first acute angle ($\alpha$) to an axial center axis of the first sleeve part and the second sleeve part comprises a second outer surface extending at a second acute angle ($\beta$) to an axial center axis of the second sleeve part. The present disclosure also relates to a furnace.

31 Claims, 4 Drawing Sheets

(51) Int. Cl.
*F16L 13/04* (2006.01)
*F27D 9/00* (2006.01)

(58) Field of Classification Search
USPC .................. 285/288.5, 288.6, 288.9, 123.15
See application file for complete search history.

(56) References Cited

U.S. PATENT DOCUMENTS

| | | | | |
|---|---|---|---|---|
| 2,014,564 | A | | 9/1935 | Harnsberger |
| 2,533,885 | A | * | 12/1950 | Hill .................... F16L 15/08 285/40 |
| 2004/0245768 | A1 | * | 12/2004 | Giacomelli .............. F16L 1/20 285/123.1 |
| 2008/0252074 | A1 | * | 10/2008 | Ohngren .............. F16L 21/002 285/333 |

FOREIGN PATENT DOCUMENTS

| | | | | | |
|---|---|---|---|---|---|
| GB | | 280644 | A | * 11/1927 | ............. F16L 13/06 |
| GB | | 341605 | A | *  1/1931 | ............. F16L 13/06 |
| GB | | 496293 | A | * 11/1938 | ......... F16L 13/0218 |
| GB | | 496293 | A | 11/1938 | |
| GB | | 513178 | A | * 10/1939 | ............. F16L 13/04 |
| JP | H06-218583 | | A | 8/1994 | |
| JP | H09-257167 | | A | 9/1997 | |

* cited by examiner

TUBE ARRANGEMENT AND FURNACE

TECHNICAL FIELD

The invention relates to a tube arrangement. The invention further relates to a furnace comprising a tube arrangement.

BACKGROUND

Internal tube arrangements, such as for example coils, straight or partly bent tubes used for carrying out a process in an industrial furnace, may consist of separate tube lengths or sections joined together by welding. In order to obtain a reliable gas tight sealing functionality of the joints between separate tube sections, welds are often preferred instead of thread+couplings as the means for connecting the tubes. As long as the tubes which have been joined by welding and the weld filler alloy used consist of the same or near the same alloys, there will be very limited diffusion (almost zero) of alloy elements across the weld from one tube section to the other tube section over time. However, there may be applications in which a first metal tube comprising a first metal alloy and a second tube comprising a second metal alloy are to be joined, in this case diffusion of alloy elements may occur and also at least one brittle phase may be formed in the weld or in either of the tube section areas directly adjacent to the weld. This will make the location mechanically weaker than a weld between alloys of the same or near same chemical composition. Thus, such welds and/or adjacent areas, may with time become a weak point in the tube arrangement and may optionally not be able to adopt the mechanical load designed to carry during use thereof.

An example of one such position in a steam cracker furnace is the outlet section of a steam-cracking furnace in which ethylene is produced by means of cracking of hydrocarbons conducted by said tube arrangement. At high temperatures in a furnace, alloys used in tubes may at least partially lose their elastic properties and may become at least partially plastically deformable, which puts further requirements on the joints between the tubes.

GB 496293 discloses joints in pipes for high pressure steam. A welded circumferential joint between the abutting end surfaces of the walls of pipes is reinforced by external sleeves or collars which are secured to the outer longitudinal surfaces of the pipes so as to prevent relative axial movement and are welded at their adjacent ends. The welded joint between the pipes may be made over a liner, which may be welded to the pipe. The sleeves may be secured on the pipes by buttress screw threads. When connected by screw threads or grooves, the adjacent end of either or both sleeves may be welded to the pipes so as to provide good thermally conducting connections therebetween. The sleeves may be welded direct together or may be welded together through an interposed member. The pipes may be of steel containing 0.5 percent of molybdenum having high creep resistance but low ductility under such conditions and the sleeves and the welds may be of mild steel which has a high ductility under creep conditions and has practically the same total thermal expansion as the alloy steel at any operating temperature over a range 750-1000 degrees F. (approximately 400-535 degrees Celsius). Layers of mild steel weld metal may be applied to the ends of the pipes before affecting the weld.

SUMMARY

It is an object of the invention to provide an improved tube arrangement wherein two tubes are joinable.

According to an aspect of the invention, the object is achieved by a tube arrangement comprising a first metal tube, a second metal tube, a first sleeve part, and a second sleeve part. A first end region of the first metal tube comprises a first outer threading and a second end region of the second metal tube comprises a second outer threading. The first sleeve part is made of metal and comprises a first inner threading and the second sleeve part is made of metal and comprises a second inner threading. The first end region is configured to be joined with the second end region via a first butt weld joint. A first proximal sleeve end of the first sleeve part is configured to be joined with a second proximal sleeve end of the second sleeve part via a second butt weld joint. The first sleeve part comprises a first outer surface extending at a first acute angle to an axial centre axis of the first sleeve part and forming a first conical sleeve portion with its wide end at the first proximal sleeve end, and the second sleeve part comprises a second outer surface extending at a second acute angle to an axial centre axis of the second sleeve part and forming a second conical sleeve portion with its wide end at the second proximal sleeve end.

Since the first and second sleeve parts comprise outer surfaces extending at acute angles forming conical sleeve portions, conditions are provided for a gradual distribution of load over the first and second metal tubes via the engaged first inner and outer threadings and the engaged second inner and outer threadings, when the first and second metal tubes are joined by the first butt weld joint and the first and second sleeve parts are joined by the second butt weld joint, and when the first and second metal tubes are subjected to a force comprising a component extending substantially in parallel with one of the axial centre axes of the first and second sleeve parts. Thus, conditions for at least partially relieving the first butt weld joint from load are provided. As a result, the above mentioned object is achieved.

The tube arrangement comprises an assembly of four separate parts, the first and second metal tubes and the first and second sleeve parts. In use of the tube arrangement, the first and second metal tubes are joined by the first butt weld joint, and the first and second sleeve parts are joined by the second butt weld joint. The tube arrangement may be used in various applications. For instance, the tube arrangement may form part of a furnace. Thus, the tube arrangement, in use, may be subjected to high temperatures.

According to embodiments, the first sleeve part may comprise a first ring shaped portion at a first distal sleeve end of the first sleeve part opposite to the first sleeve end, and the second sleeve part may comprise a second ring shaped portion at a second distal sleeve end of the second sleeve part opposite to the second sleeve end. In this manner, each of the first and second ring shaped portions forms an enforcement of the first sleeve part and the second sleeve part, respectively. The ring shaped portions enforce the sleeve parts at ends thereof opposite to where the second butt weld joint is to be arranged. Thus, radial expansion of the sleeve parts is reduced. Accordingly, the load distribution via the inner and outer threadings may be maintained.

According to embodiments, the tube arrangement may be arranged for high temperature use, above 750 degrees Celsius. In this manner, the tube arrangement according to aspects and/or embodiments discussed herein may be utilised to prevent, or at least delay, rupture of the tube arrangement caused by high temperature use.

It is a further object of the invention to prolong an operational lifespan of a furnace.

According to an aspect of the invention, the object is achieved by a furnace comprising a chamber, a burner arrangement for generating heat, and a tube arrangement according to any one of aspects and/or embodiments discussed herein for conducting a gas and/or steam through the furnace.

Since the tube arrangement is devised for high temperature use due to features according to any one of aspects and/or embodiments discussed herein, the furnace may be operated longer before the furnace requires refurbishing including replacement of the tube arrangement.

Further features of, and advantages with, the invention will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which.

DETAILED DESCRIPTION

Aspects and/or embodiments of the invention will now be described more fully. Like numbers refer to like elements throughout. Well-known functions or constructions will not necessarily be described in detail for brevity and/or clarity.

Though the disclosure is applicable to all applications in which an outer sleeve is used for the purpose of supplementing or replacing the load-carrying function of a butt weld joint between two metal tubes, the present disclosure inter alia describes to an application in which tubes are used in furnaces for cracking of hydrocarbons, such as e.g. for the production of ethylene. It should be understood that the present disclosure is not restricted to such an application.

Figure 1:
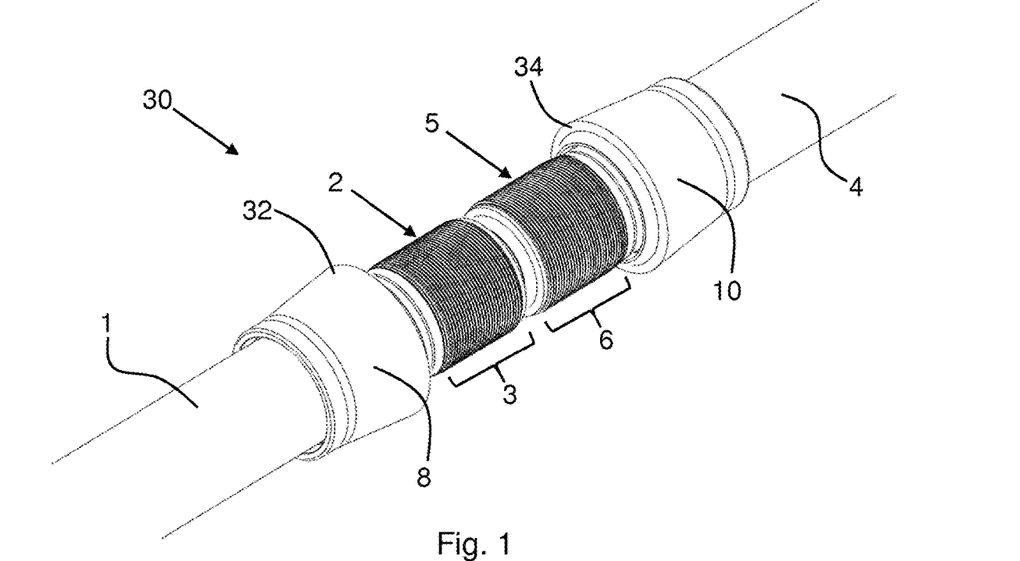
FIG. 1 illustrates a tube arrangement according to embodiments.

FIG. 1 illustrates a tube arrangement 30 according to embodiments. The tube arrangement 30 comprises a first metal tube 1, a second metal tube 4, a first sleeve part 8, and a second sleeve part 10. A first end region 3 of the first metal tube 1 comprises a first outer threading 2 and a second end region 6 of the second metal tube 4 comprises a second outer threading 5. The first sleeve part 8 is made of metal and the second sleeve part 10 is made of metal. The first and second sleeve parts 8, 10 comprise inner threadings. Thus, the first and second sleeve parts 8, 10 may be screwed along the respective first and second outer threadings 2, 5 towards each other.

The first end region 3 of the first metal tube 1 is configured to be joined with the second end region 6 of the second metal tube 4 via a first butt weld joint. A first proximal sleeve end 32 of the first sleeve part 8 is configured to be joined with a second proximal sleeve end 34 of the second sleeve part 10 via a second butt weld joint, see below with reference to FIG. 2c. Thus, the tube arrangement 30 is configured to form one conduit comprising the first and second metal tubes 1, 4, through which conduit hot gases may be conducted, while the first and second sleeve parts 8, 10, when joined via the second butt weld joint forming a sleeve for at least partially relieving the first butt weld joint of load.

Figure 2A:
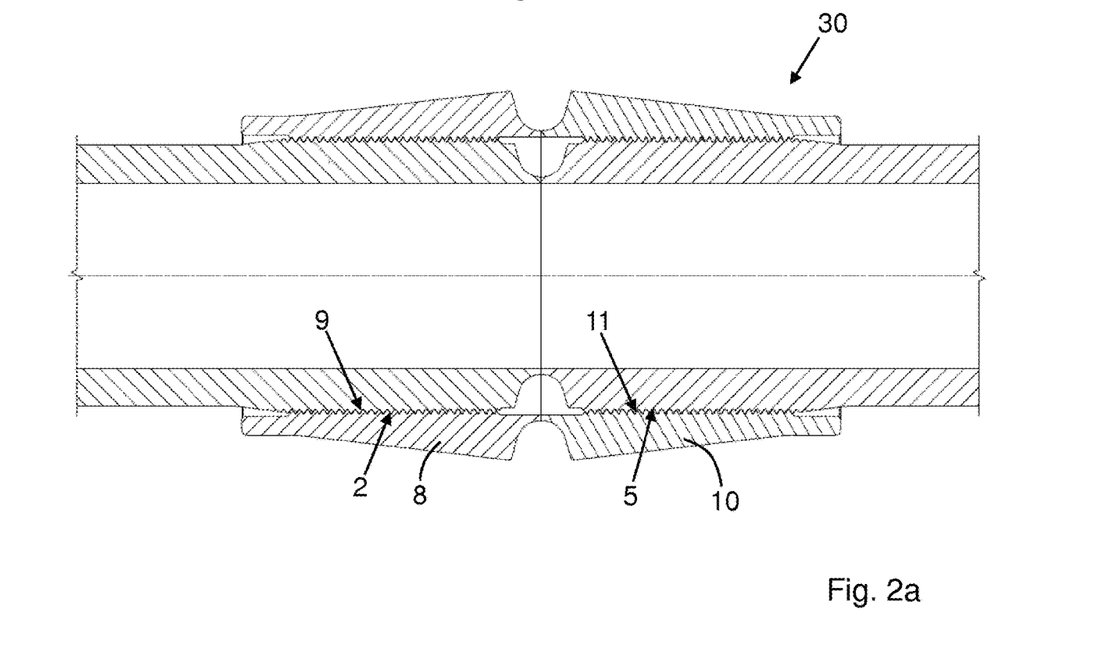
FIGS. 2a-2e show cross sections through the tube arrangement of FIG. 1.

FIG. 2a shows a cross section through the tube arrangement 30 of FIG. 1. In FIG. 2a the first sleeve part 8 with its inner threading 9 is positioned on the first outer threading 2 to abut against the second sleeve part 10, which with its second inner threading 11 is positioned in a corresponding position on the second outer threading 5. The first proximal sleeve end 32 of the first sleeve part 8 is configured to be positioned adjacent to and joined with the second proximal sleeve end 34 of the second sleeve part 10 via the second butt weld joint.

Figure 2B:
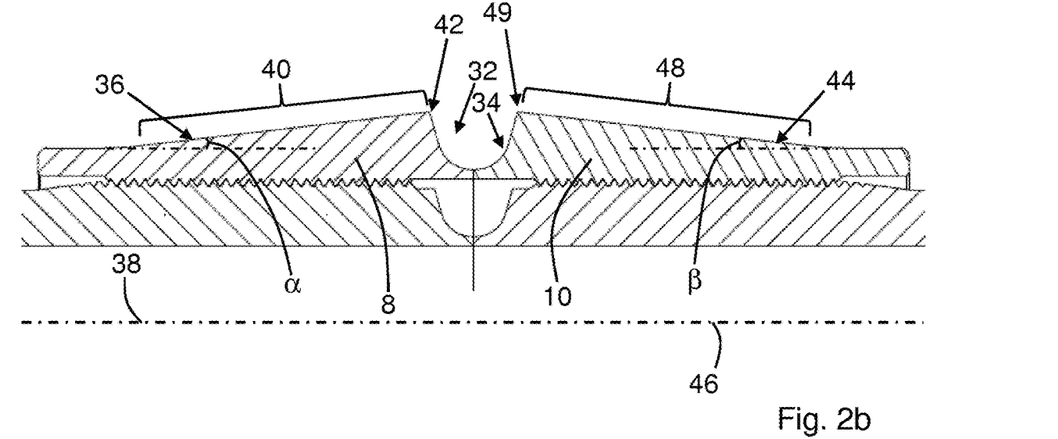

FIG. 2b illustrates a portion of the cross section of FIG. 2a. The first sleeve part 8 comprises a first outer surface 36 extending at a first acute angle α to an axial centre axis 38 of the first sleeve part 8. The first outer surface 38 forms a first conical sleeve portion 40 with its wide end 42 at the first proximal sleeve end 32. The second sleeve part 10 comprises a second outer surface 44 extending at a second acute angle β to an axial centre axis 46 of the second sleeve part 10. The second outer surface 44 forms a second conical sleeve portion 48 with its wide end 49 at the second proximal sleeve end 34.

The tube arrangement 30 provides conditions for a gradual distribution of load over the first and second metal tubes 1, 4, when they are joined, and when the first and second sleeve parts 8, 10 are joined. Accordingly, the tube arrangement 30 forms an assembly of parts, which may be sold and/or distributed. Alternatively, the different parts of the tube arrangement 30 may be sold and/or distributed separately. The tube arrangement 30 may be installed e.g. in a furnace, either forming a new tube arrangement 30 of a new furnace, or replacing an old tube arrangement of an existing furnace. For instance, the second metal tube 4 may be butt welded to a tube connection of the furnace, e.g. an inlet or an outlet of the furnace. Where after, the first metal tube 1 may be joined with the second metal tube 4 via the first butt weld joint, and the first and second sleeve parts 8, 10 may be joined via the second butt weld joint. Accordingly, when installed, e.g. in a furnace, the tube arrangement 30 also comprises the first and second butt weld joints.

Figure 2C:
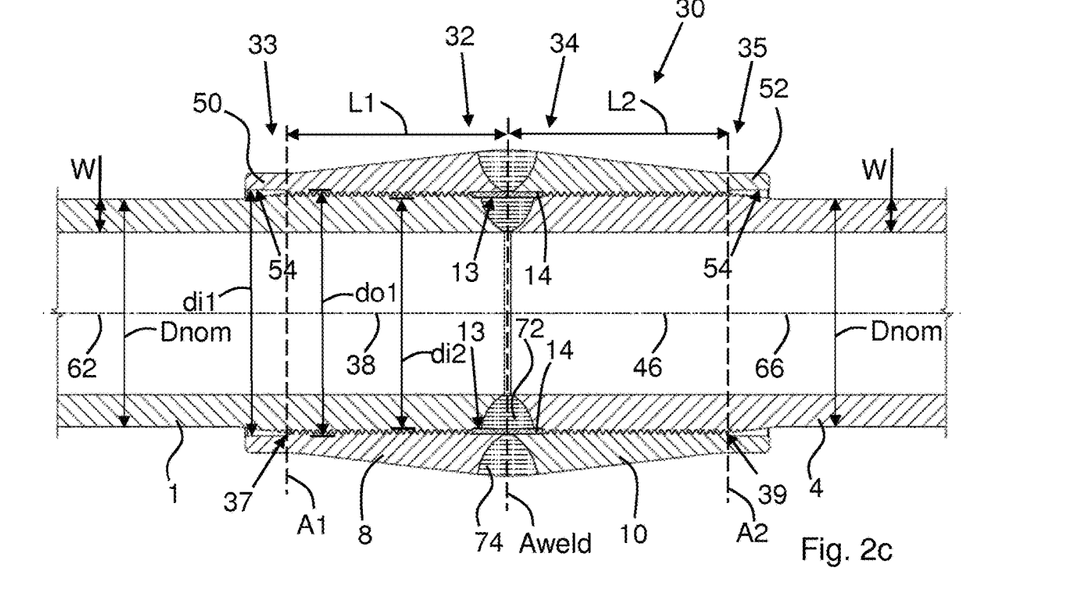

FIG. 2c shows a cross section through the tube arrangement 30 of FIG. 1 with the first and second metal tubes 1, 4 welded together and the first and second sleeve parts 8, 10 welded together. Thus, according to some embodiments, the tube arrangement 30 may comprise a first butt weld joint 72 joining the first and second metal tubes 1, 4 at the first and second end regions 3, 6, and a second butt weld joint 74 joining the first and second sleeve parts 8, 10. In this manner, the first and second sleeve parts 8, 10 form one sleeve enclosing the first and second end regions 3, 6 of the first and second metal tubes 1, 4 and the first butt weld joint 72. Thus, the one sleeve formed by the first and second sleeve parts 8, 10 may relieve the first butt weld joint 72 from load when the first and second metal tubes 1, 4 are subjected to a force having a force component extending substantially in a direction along the axial centre axes 38, 46.

The opposing ends of the first and second metal tubes 1, 4 that are joined by means of the first butt weld joint 72 are bevelled such that the first butt weld joint 72 has a U-shaped, or V-shaped, cross section with its wider end directed radially outwardly from the centre axes 38, 46.

The first and second proximal sleeve ends 32, 34 of the first and second metal sleeve parts 8, 10 that are joined by the second butt weld joint 74 are bevelled such that the second butt weld joint 74 has a U-shaped, or V-shaped, cross section with its wider end directed outwardly from the centre axes 38, 46.

Since the first sleeve part 8 comprises the first conical sleeve portion 40 and the second sleeve part 10 comprises the second conical sleeve portion 48, the first and second sleeve parts 8, 10 will elongate differently along their respective extensions along the axial centre axes 38, 46 when put under tensile load. More specifically, the smaller the diameter of the conical sleeve portions 40, 48, the more the relevant portions of the sleeve parts 8, 10 will elongate. Accordingly, the bigger diameter ends of the conical sleeve portions 40, 48 will elongate to a lesser extent than the smaller diameter ends, when put under tensile load. Thus, the load is transferred from the first and second metal tubes 1, 4 over a larger number of threads of the first and second inner and outer threadings 2, 5, 9, 11, than if the first and second sleeve parts were lacking conical sleeve portions. Accordingly, each load bearing thread will bear a smaller portion of the total load, saving the first and second inner and outer threadings 2, 5, 9, 11. In this manner, the first and second inner and outer threadings 2, 5, 9, 11 may last longer than in a tube arrangement comprising first and second sleeve parts lacking conical sleeve portions.

According to embodiments, the tube arrangement 30 may be arranged for high temperature use, above 750 degrees Celsius. For instance, the tube arrangement 30 may be subjected to such high temperatures in a furnace. According to some embodiments, the tube arrangement 30 may be subjected to temperatures within a range of 900-1100 degrees Celsius. Within this temperature range a furnace for producing ethylene by cracking of hydrocarbons may operate. Moreover, such a furnace may be subjected to regular decoke cycles. During such decoke cycles, steam at temperatures reaching up to 1200 degrees Celsius may be used. Accordingly, in some embodiments, the tube arrangement 30 may be subjected to temperatures of up to 1200 degrees Celsius. Moreover, the tube arrangement 30 will be cooled down to ambient temperature, e.g. 20 degrees Celsius, when the furnace is shut off.

At low temperatures, metals such as e.g. ferrous metals, have elastic properties. At the above mentioned high temperatures, the metals lose at least partly their elastic properties and become at least partly plastically deformable, i.e. not regaining their original shape after being relieved of a load.

Accordingly, the above discussed distribution of load over a larger number of threads of the first and second inner and outer threadings 2, 5, 9, 11 becomes particularly useful in high temperature use of the tube arrangement 30. Namely, it has been realised by the inventor that the elasticity of a metal relied upon in threaded engagement between two threaded parts at low temperature is not available at the high temperature as discussed above. A threaded connection may be capable of bearing a high level load at low temperatures. At high temperatures, the same high level load may cause the threads of the threaded connection to plastically deform one after the other. Eventually the threaded connection will rupture. As realised by the inventor, the provision of the conical sleeve portions 40, 48 and the resulting distribution of load over a larger number of threads may keep the load on each individual thread sufficiently low to prevent, or at least considerably prolong the time until, rupture of the threadings 2, 5, 9, 11.

Figure 2D:
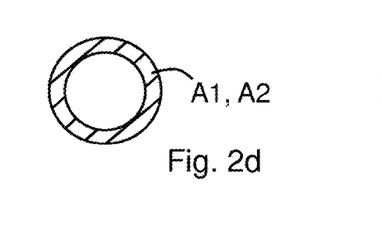
Figure 2E:
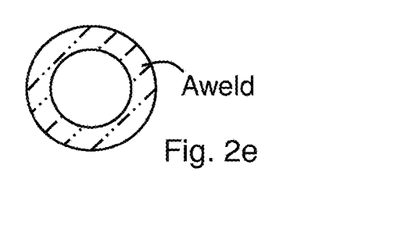

Each of the first and second metal tubes 1, 4 has a nominal diameter, Dnom. That is, the nominal diameter Dnom is the diameter of the respective metal tube 1, 4 at a distance from the first and second outer threadings 2, 5 and from upset forged portions of the metal tubes 1, 4, see below with reference to FIG. 3a. Each of the first and second metal tubes 1, 4 has a nominal cross sectional area, Anom. That is, the nominal cross sectional areal Anom is the cross sectional area of the goods of the respective metal tube 1, 4 at a distance from the first and second outer threadings 2, 5 and from the upset forged portions of the metal tubes 1, 4. The nominal cross section area, as well as other cross sectional areas of the metal tubes 1, 4, and/or the first and second sleeve parts 8, 10, discussed below extend perpendicularly to the respective axial centre axes 38, 46, 62, 66 of the first and second sleeve parts 8, 10 and the first and second metal tubes 1, 4. The first sleeve part 8 comprises a first distal sleeve end 33 opposite to the first proximal sleeve end 32 and the second sleeve part 10 comprises a second distal sleeve end 35 opposite to the second proximal sleeve end 34. The first inner threading 9 ends at a first threading end 37 within a region of the first distal sleeve end 33, and the first sleeve part 8 has a first threading end cross sectional area, A1, at the first threading end 37. The second inner threading 11 ends at a second threading end 39 within a region of the second distal sleeve end 35, and the second sleeve part 10 has a second threading end cross sectional area, A2, at the second threading end 39. The first and second threading end cross sectional areas, A1, A2 are shown in FIG. 2d and extend circumferentially about the first and second sleeve parts 8, 10 respectively in the planes indicated with broken lines A1, A2 in FIG. 2c. Suitably, the first and second threading end cross sectional areas A1, A2 are measured between a bottom diameter of the first and second inner threadings 9, 11 and an outer diameter of the first and second sleeve parts 8, 10 at the first and second threading end cross sectional areas A1, A2. When the first and second proximal sleeve ends 32, 34 are joined by the second butt weld joint 74, at the second butt weld joint 74 the first and second conical sleeve parts 8, 10 including the second butt well joint are configured to have a welding plane cross sectional area, Aweld. The welding plane cross sectional area, Aweld is shown in FIG. 2e and extends circumferentially about the second butt weld joint 74 in the plane indicated with a broken line Aweld in FIG. 2c. A first length L1 extends between A1 and Aweld, and a second length L2 extends between A2 and Aweld.

Figure 4:
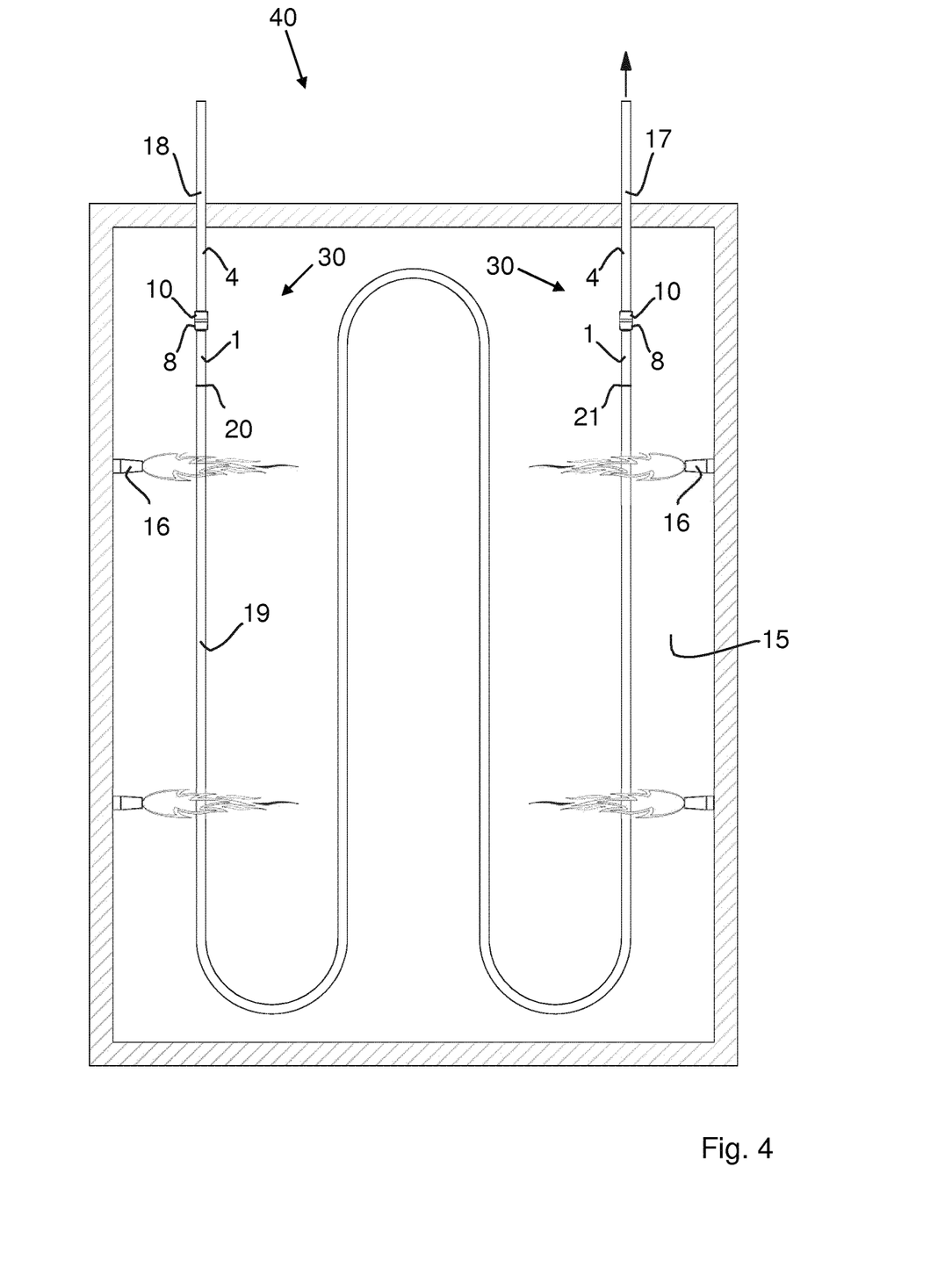
FIG. 4 illustrates a furnace according to embodiments.

According to embodiments, the first acute angle ($\alpha$) and the second acute angle ($\beta$) may be formed by:

Aweld being within a range of 1.3-2.3 times Anom, each of A1 and A2 being within a range of 0.3-0.5 times Aweld, and each of L1 and L2 being within a range of 0.8-1.5 times Dnom. In this manner, the first and second conical sleeve portions 40, 48 may be configure to provide a suitable distribution of load along a length of the first and second inner and outer threadings 2, 5, 9, 11 in parallel with the axial centre axes 38, 46. In particular, when the tube arrangement 30 is arranged such that it axial centre axes 38, 46, 62, 66 extend in a substantially vertical direction, e.g. as illustrated in FIG. 4, the load on the first and second metal tubes 1, 4 is distributed over the first and second inner and outer threadings 2, 5, 9, 11 in a favourable manner to the first and second sleeve parts 8, 10 such that the first butt weld joint 72 is relieved of at least part of the load.

The welding plane cross sectional area, Aweld being within a range of 1.3-2.3 times the nominal cross sectional areal, Anom may alternatively be expressed as:

$$Aweld = (1.8 +/- 0.5) \times Anom.$$

Each of A1 and A2 being within a range of 0.3-0.5 times Aweld, may alternatively be expressed as:

$$A1 = (0.4 +/- 0.1) \times Aweld, \text{ and}$$

$$A2 = (0.4 +/- 0.1) \times Aweld.$$

Each of L1 and L2 being within a range of 0.8-1.5 times Dnom, may alternatively be expressed as:

$L1 = (1 + 0.5/-0.2) \times Dnom$, and $L2 = (1 + 0.5/-0.2) \times Dnom$.

According to some embodiments, at least one of Aweld, A1, A2, L1, and L2 may alternatively be:

$Aweld = (1.8 +/- 0.3) \times Anom$, $A1 = (0.4 +/- 0.05) \times Aweld$, $A2 = (0.4 +/- 0.05) \times Aweld$.

$L1 = (1 +/- 0.1) \times Dnom$, and $L2 = (1 +/- 0.1) \times Dnom$.

Providing at least one of Aweld, A1, A2, L1, and L2 within the more narrow interval may provide first and second sleeve parts 8, 10 more precisely dimensioned to distribution of load along a length of the first and second inner and outer threadings 2, 5, 9, 11 in parallel with the axial centre axes 38, 46, than within the above discussed wider intervals.

According to embodiments, the first inner threading 9 may extend along at least a portion of the first conical sleeve portion 40, and the second inner threading 11 may extend along at least a portion of the second conical sleeve portion 48. In this manner, each of the first and second conical sleeve portions 40, 48 may be elongated under load in order to distribute a load over the first and second inner threadings 9, 11, and consequently over the first and second outer threadings 2, 5. The first and second inner threadings 9, 11 may extend along the respective first and second conical sleeve portions 40, 48 in parallel with the respective centre axes 38, 46. Mentioned purely as an example, the length of the first and second inner and outer threadings 2, 5, 9, 11 may be approximately 0.8-1.5 times a diameter of one of the first and second metal tubes 1, 4.

Some embodiments of the tube arrangement 30 may be subjected to temperature cycling at the high temperature discussed above. For instance, in a furnace for producing ethylene by cracking of hydrocarbons, temperature cycling between the cracking temperature at e.g. 900-1100 degrees Celsius, a decoking temperature of e.g. approximately 1200 degrees Celsius, and ambient temperature, e.g. 20 degrees, at occasional shutdowns of the furnace. Such temperature cycling may inter alia cause radial expansion of sleeve parts, which would form funnel shaped or conically shaped end portions of the sleeve parts, causing reduced engagement between the inner threadings of the sleeve parts and the outer threadings of the first and second metal tubes.

According to embodiments, the first sleeve part 8 may comprise a first ring shaped portion 50 at a first distal sleeve end 33 of the first sleeve part 8 opposite to the first proximal sleeve end 32, and the second sleeve part 10 may comprise a second ring shaped portion 52 at a second distal sleeve end 35 of the second sleeve part 10 opposite to the second distal sleeve end 34. In this manner, each of the first and second ring shaped portions 50, 52 forms an enforcement of the first sleeve part 8 and the second sleeve part 10, respectively. The ring shaped portions 50, 52 enforce the sleeve parts 8, 10 at ends thereof opposite to where the second butt weld joint 74 is arranged. Moreover, the provision of the first and second ring shaped portions 50, 52 may prevented, or at least delayed, the forming of funnel shaped or conically shaped first and second distal end portions of the sleeve parts 8, 10, when the tube arrangement 30 is subjected to temperature cycling.

According to embodiments, each of the first and second ring shaped portions 50, 52 may have an inner diameter di1 larger than an outer diameter do1 of each of the first and second outer threadings 2, 5, and each of the first and second ring shaped portions 50, 52 may have an even inner surface 54. In this manner, the first and second ring shaped portions 50, 52 may go free of the first and second outer threadings 2, 5, respectively. Thus, permitting unhindered rotation of the first and second sleeve parts 8, 10 on the first and second outer threadings 2, 5.

Further, when the first and second sleeve parts 8, 10 are positioned on the first and second metal tubes 1, 4 and joined by the second butt weld joint 74, each of the first and second ring shaped portions 50, 52 will cover a portion of the first and second outer threadings 2, 5 or an outer surface of the first and second metal tubes 1, 4 adjacent to the first and second outer threading is 2, 5. Thus, e.g. in a furnace, the first and second metal tubes 1, 4 will be protected from direct thermal radiation in these sensitive areas of the first and second metal tubes 1, 4.

According to embodiments, each of the first and second outer threadings 2, 5 may be threadings according to ISO 5855. In this manner, low concentration of stress will form in the first and second metal tubes 1, 4 at the bases of the first and second outer threadings 2, 5. The threadings according to ISO 5855, may also be referred to as aerospace metric threads, or MJ threads.

According to embodiments, each of the above-mentioned end regions 3, 6 of the first and second metal tubes 1, 4 may be provided with a larger outer diameter and a larger wall thickness than an adjacent part of the first and second metal tube 1, 4 associated thereto.

The bottom of each outer threading 2, 5 may encircle a circle having a larger diameter than the diameter of said adjacent part of the respective first and second metal tube 1, 4. Accordingly, the inner diameter di2 of the first metal sleeve part 8 may be larger than the outer diameter do2 of said adjacent part of the first metal tube 1, and the inner diameter of the second metal sleeve part 10 may larger than the diameter of said adjacent part of the second metal tube 4. The outer diameter do1 of said end region 3 of the first metal tube 1 corresponds to the outer diameter of said end region 6 of the second metal tube 4.

Figure 3A:
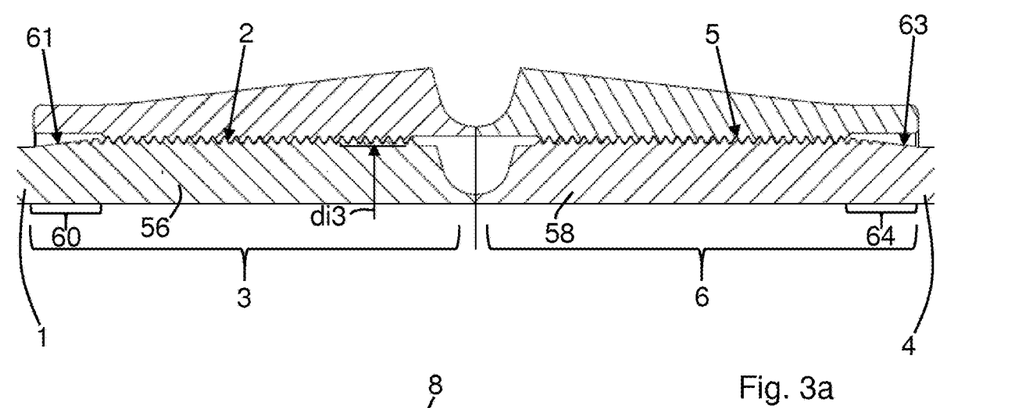
FIGS. 3a-3c show partial cross sections through the tube arrangement of FIG. 1.

FIG. 3a shows a portion of a cross section similar to that of FIG. 2b.

According to embodiments, the first end region 3 may comprise a first upset forged tube portion 56 extending at least over an axial length of the first outer threading 2, and the second end region 6 may comprise a second upset forged tube portion 58 extending at least over an axial length of the second outer threading 5. In this manner, the end regions 3, 6 may be provided with larger outer diameter and larger wall thickness than an adjacent part of the first and second metal tube 1, 4, respectively.

Upset forging is an operation which increases the diameter of the metal tube by compressing its length.

According to embodiments, a cross sectional area of the first and second end regions 3, 6 at an inner diameter di3 of each of the first and second outer threadings 2, 5 is at least 105%, or at least 110%, of a cross sectional area of each of the first and second metal tubes 1, 4 outside the first and second upset forged tube portions 56, 58. In this manner, strong first and second end regions 3, 6 of the first and second metal tubes 1, 4 may be provided.

Figure 3B:
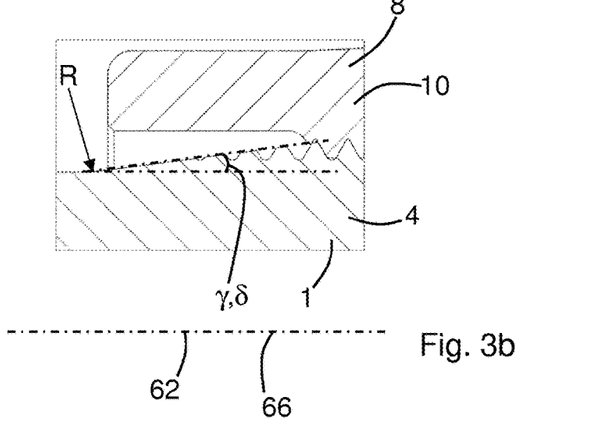

FIG. 3b illustrates a partial enlargement of a cross section through the first sleeve part 8 and the first metal tube 1. A mirror image of FIG. 3b corresponds to the same portion of the second sleeve part 10 and the second metal tube 4. In the following reference is made to FIGS. 3a and 3b.

According to embodiments, the first upset forged tube portion 56 may comprise a first conical tube portion 60 having an outer surface 61 extending at an acute angle γ within a range of 2-10 degrees to an axial centre axis 62 of the first metal tube 1, and the second upset forged tube portion 58 may comprise a second conical tube portion 64 having an outer surface 63 extending at an acute angle δ within a range of 2-10 degrees to an axial centre axis 66 of the second metal tube 4. In this manner, each of the first and second conical tube portions 60, 64 provide a gradual transition between each of the first and second upset forged tube portions 56, 58 and respective thereto adjacent portions of the metal first and second tubes 1, 4. Such gradual transitions may reduce concentration of stress in the regions between the upset forged tube portions 56, 58 and the thereto adjacent portions of the first and second metal tubes 1, 4.

According to embodiments, a transition from each of the first and second conical tube portions 60, 64 to a respective portion of the first and second metal tubes 1, 4 adjacent to the first and second upset forged tube portions 56, 58 may have a radius R of at least 5 mm. In this manner, concentration of stress in the transitions between the upset forged tube portions and the thereto adjacent portions of the first and second metal tubes 1, 4 may be reduced.

Figure 3C:
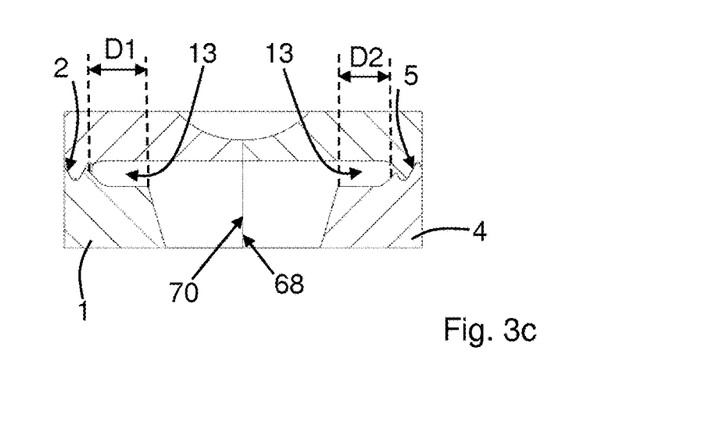

FIG. 3c illustrates a partial enlargement of a cross section through the first and second sleeve parts 8, 10 and the first and second metal tubes 1, 4. In the following reference is made to FIGS. 3a and 3c.

According to embodiments, each of the first and second metal tubes (1, 4) has a wall thickness, W. The first outer threading 2 may end at a first distance, D1, from an end 68 of the first metal tube 1 at the first end region 3. The first distance, D1, may correspond at least to the wall thickness, W. The second outer threading 5 may end at a second distance, D2, from an end 70 of the second metal tube 4 at the second end region 6. The second distance, D2, may correspond at least to the wall thickness, W. In this manner, the first and second outer threadings 2, 5 may be less likely to be subjected to welding spatter during welding of the first butt weld joint 72 than if the first and second outer threadings 2, 5 would extend to the respective ends 68, 70 of the first and second metal tubes 1, 4. Welding spatter in the first and second outer threadings 2, 5 may require cumbersome removing thereof. Otherwise, the first and second sleeve parts 8, 10 might not be screwed onto the first and second outer threadings 2, 5 to meet with their ends for welding the second butt weld joint 74.

According to embodiments, an annular space 13 may be formed between the first and second sleeve parts 8, 10 and the first and second metal tubes 1, 4 in an area of the first and second butt weld joints 72, 74. In this manner, the second butt weld joint 72 connecting the first and second metal sleeve parts 8, 10 may be prevented from contacting and interacting with the first and second metal tubes 1, 4 and from contacting and interacting with the first butt weld joint 74 connecting the first and second metal tubes 1, 4.

Returning to FIG. 2c, according to embodiments, a ceramic protection member 14 may be arranged in the annular space 13. In this manner, the ceramic protection member 14 may prevent the second butt weld joint 74 connecting the first and second metal sleeve parts 8, 10 from contacting and interacting with the first and second metal tubes 1, 4 and the first butt weld joint 72 connecting the latter. The protecting member 14 may comprise two half-circle formed portions positionable over the first butt weld joint 72. Mentioned as an example, the ceramic protection member 40 may comprise a fibrous ceramic material such as e.g. aluminium oxide or titanium oxide.

Referring to all of FIGS. 1-3c, according to embodiments, the first metal tube 1 may comprise a first metal alloy and the second metal tube 4 may comprises a second metal alloy, and the first metal alloy and the second metal alloy may be of different alloy compositions.

Thus, at least one brittle phase may form in the first butt weld joint 72 as a consequence of the first and second metal alloys having different alloy compositions and thereby different material chemistry. The alloying elements comprised therein will interact and form said brittle phase upon welding, thus making the first butt weld joint 72 mechanically weaker than the respective metal tubes 1, 4. Here, the first metal alloy may be FeCrAl alloy, and the second metal alloy may be FeCrNi alloy. The above-mentioned brittle phase may thus include nickel aluminides. In the exemplifying embodiment presented here, the first metal alloy contains, in weight %: C up to 0.08, Si up to 0.7, Cr 10-25, Al 1-10, Mo 1.5-5, Mn up to 0.4, balance Fe and normally occurring impurities.

According to embodiments, the first sleeve part 8 and the second sleeve part 10 may have the same alloy composition.

The first and second sleeves 8, 10 may be made of steel having the same or at least corresponding chemical composition. In the exemplifying embodiment presented here, the metal alloy of the first and second sleeves 8, 10 may be the above-mentioned first metal alloy, which contains, in weight %: C up to 0.08, Si up to 0.7, Cr 10-25, Al 1-10, Mo 1.5-5, Mn up to 0.4, balance Fe and normally occurring impurities.

The second inner threading 11 of the second metal sleeve part 10 may comprise an alumina layer (not visible on the figures). The risk of having iron oxide on the surface of the threadings of the first metal alloy is even larger when the opposing part, in this case the second metal tube 4, is made of the above-mentioned second metal alloy and the second sleeve part 10 is formed by the first metal alloy. In such case, at least the second inner threading 11 of the second metal sleeve part 10 should be subjected to a pre-oxidation treatment and whereby an alumina layer is obtained thereon as a result thereof. In the exemplifying embodiment presented here, the first inner threading 9 of the first sleeve part 8 may also comprise a protecting alumina layer. Also, the first outer threading 2 of the first metal tube 1 may comprise a protective alumina layer.

The tube arrangement 30 presents a gas-tight connection between the first and second metal tubes 1, 4 defined by the first butt weld joint 72 connecting the first and second metal tubes 1, 4, while a sleeve formed by the first and second metal sleeve parts 8, 10 forms a load-carrying part of the tube arrangement 30, which reduces the mechanical load needed to be adopted by the first butt weld joint 72 connecting the first and second metal tubes 1, 4. According to some exemplifying embodiments, the load-carrying part formed by the first and second metal sleeve parts 8, 10 connected by the second butt weld joint 74 may be designed to carry a larger part of mechanical load to which the tube arrangement 30 is subjected than may be carried by the first butt weld joint 72.

A butt welding process for welding the first and second butt weld joints 72, 74 is suggested to comprise a TIG (tungsten inert gas)-welding process, possibly manual, using the above-mentioned first metal alloy as the filling material.

However, other suitable alloys may also be used as filling material. The filling material may be in the form of a strip or a wire.

Before providing said end regions 3, 6 of the first and second metal tubes 1, 4 with said outer threading 2, 5, the metal tubes 1, 4 may be subjected to a treatment by means of which the end region 3, 6 thereof is provided with a larger outer diameter and a larger wall thickness than an adjacent part of the corresponding metal tube 1, 4. As discussed above, this treatment may comprise a forging step, also referred to as upsetting, or upset forging.

Before joining by butt welding the opposed ends of the first and second metal sleeve parts 8, 10, the ceramic protection member 14 may be positioned between the first and second sleeve parts 8, 10 and the first and second metal tubes 1, 4 at a position in which it will prevent the second butt weld joint 74 of the first and second metal sleeve parts 8, 10 from contacting and interacting with the first and second metal tubes 1, 4 and the first butt weld joint 72.

As mentioned above, the second inner threading 11 of the second metal sleeve part 10 may be subjected to a pre-oxidation treatment before the second sleeve part 10 is positioned on the second metal tube 4 and before the second metal tube 4 is joined with the first metal tube 1. The pre-oxidation treatment may comprise heating the second metal sleeve part 10 to a temperature of approximately 1100° C. for a period of approximately 8 hours.

In the exemplifying embodiment presented here, also the first inner threading 9 of the first metal sleeve part 8 and the first outer threading 2 of the first metal tube 1 may be provided with an alumina layer by means of a corresponding heat treatment.

Under some of the high temperature conditions discussed above, a connection between two metal tubes may eventually rupture, either at a butt weld joint or in an area near a butt weld joint such as e.g. in a threaded area or an area connecting to a threaded area. The measures and/or features discussed above in connection with aspects and/or embodiments of the tube arrangement 30, individually or in various combinations, will prolong the operating life span of the tube arrangement 30, as compared to a tube arrangement comprising two simple cylindrical sleeve parts being butt welded together and connected via simple threadings to first and second butt welded metal tubes.

FIG. 4 illustrates a furnace 40 according to embodiments. The furnace 40 comprises a chamber 15, a burner arrangement 16 for generating heat, and a tube arrangement 30 according to any one of aspects and/or embodiments discussed herein for conducting a gas and/or steam through the furnace 40.

According to embodiments, the furnace 40 may be configured for producing ethylene by cracking of hydrocarbons conducted through the tube arrangement 30.

The burner arrangement 16 is provided for generating heat. Two tube arrangements 30 as defined hereinabove are provided for conduction of a hot gas and/or steam through the furnace 40. Inside the chamber 15 of the furnace 40, tubing 19 to which the tube arrangements 30 are connected (here by butt welds 20, 21) is formed by a tubing 19. It is suggested that the above-mentioned first metal alloy is used as the material of said tubing 19. At the regions of an outlet 17 and an inlet 18 of the chamber 15, inside the chamber 15, the above-defined tube arrangements 30 are provided. The second metal tube 4 of one tube arrangement 30 may extend out of the chamber 15 via the outlet 17, and the second metal tube 4 of the other tube arrangement 30 may extend out of the chamber 15 via the inlet 18. Alternatively, one of the second metal tubes 4 may be butt welded to a tube of the outlet 17 and the other of the second metal tubes 4 may be butt welded to a tube of the inlet 18, as mentioned above. In the latter case, the second metal alloy, mentioned above, is used as the material in the tubes of the outlet 17 and the inlet 18. According to a further alternative, the first metal tube 1 may extend all the way between the two tube arrangements 30 at the inlet 18 and at the outlet 17 replacing the tube 19 and omitting the butt welds 20, 21.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. A tube arrangement comprising a first metal tube, a second metal tube, a first sleeve part, and a second sleeve part,
   wherein a first end region of the first metal tube comprises a first outer threading and a second end region of the second metal tube comprises a second outer threading,
   wherein the first sleeve part is made of metal and comprises a first inner threading and the second sleeve part is made of metal and comprises a second inner threading,
   wherein the first end region is configured to be joined with the second end region via a first butt weld joint,
   wherein a first proximal sleeve end of the first sleeve part is configured to be joined with a second proximal sleeve end of the second sleeve part via a second butt weld joint,
   wherein the first sleeve part comprises a first outer surface extending at a first acute angle to an axial center axis of the first sleeve part and forming a first conical sleeve portion with its wide end at the first proximal sleeve end, and the second sleeve part comprises a second outer surface extending at a second acute angle to an axial center axis of the second sleeve part and forming a second conical sleeve portion with its wide end at the second proximal sleeve end,
   wherein the first sleeve part comprises a first ring shaped portion at a first distal sleeve end of the first sleeve part opposite to the first proximal sleeve end, and wherein the second sleeve part comprises a second ring shaped portion at a second distal end of the second sleeve part opposite to the second proximal sleeve end, and
   wherein each of the first and second ring shaped portions has an inner diameter larger than an outer diameter of each of the first and second outer threadings, and wherein each of the first and second ring shaped portions has a non-threaded inner surface.

2. The tube arrangement according to claim 1, wherein each of the first and second metal tubes has a nominal diameter, $D_{nom}$, and a nominal cross sectional area, $A_{nom}$,
   wherein the first sleeve part comprises a first distal sleeve end opposite to the first proximal sleeve end and the second sleeve part comprises a second distal sleeve end opposite to the second proximal sleeve end,
   wherein the first inner threading ends at a first threading end within a region of the first distal sleeve end, and the first sleeve part having a first threading end cross sectional area, $A1$, at the first threading end,
   wherein the second inner threading ends at a second threading end within a region of the second distal sleeve end, and the second sleeve part having a second threading end cross sectional area, A2, at the second threading end, wherein when the first and second proximal sleeve ends are joined by the second butt weld joint, at the second butt weld joint the first and second conical sleeve parts including the second butt well joint are configured to have a welding plane cross sectional area, Aweld, wherein a first length L1 extends between A1 and Aweld, and a second length L2 between A2 and Aweld, and wherein the first acute angle, and the second acute angle are formed by:

Aweld being within a range of 1.3-2.3 times Anom, each of A1 and A2 being within a range of 0.3-0.5 times Aweld, and each of L1 and L2 being within a range of 0.8-1.5 times Dnom.

3. The tube arrangement according to claim 1, wherein the first inner threading extends along at least a portion of the first conical sleeve portion, and wherein the second inner threading extends along at least a portion of the second conical sleeve portion.

4. The tube arrangement according to claim 1, wherein the first end region comprises a first upset forged tube portion extending at least over an axial length of the first outer threading, and wherein the second end region comprises a second upset forged tube portion extending at least over an axial length of the second outer threading.

5. The tube arrangement according to claim 4, wherein a cross sectional area of the first and second end regions at an inner diameter of each of the first and second outer threadings is at least 105%, or at least 110%, of a cross sectional area of each of the first and second metal tubes outside the first and second upset forged tube portions.

6. The tube arrangement according to claim 5, wherein the first upset forged tube portion comprises a first conical tube portion having an outer surface extending at an acute angle (γ) within a range of 2-10 degrees to an axial center axis of the first metal tube, and wherein the second upset forged tube portion comprises a second conical tube portion having an outer surface extending at an acute angle (δ) within a range of 2-10 degrees to an axial center axis of the second metal tube.

7. The tube arrangement according to claim 6, wherein a transition from each of the first and second conical tube portions to a respective portion of the first and second metal tubes adjacent to the first and second upset forged tube portions has a radius of at least 5 mm.

8. The tube arrangement according to claim 4, wherein the first upset forged tube portion comprises a first conical tube portion having an outer surface extending at an acute angle (γ) within a range of 2-10 degrees to an axial center axis of the first metal tube, and wherein the second upset forged tube portion comprises a second conical tube portion having an outer surface extending at an acute angle (δ) within a range of 2-10 degrees to an axial center axis of the second metal tube.

9. The tube arrangement according to claim 8, wherein a transition from each of the first and second conical tube portions to a respective portion of the first and second metal tubes adjacent to the first and second upset forged tube portions has a radius of at least 5 mm.

10. The tube arrangement according to claim 1, wherein each of the first and second metal tubes has a wall thickness, W, wherein the first outer threading ends at a first distance, D1, from an end of the first metal tube at the first end region, wherein the first distance, D1, corresponds at least to the wall thickness, W, wherein the second outer threading ends at a second distance, D2, from an end of the second metal tube at the second end region, and wherein the second distance, D2, corresponds at least to the wall thickness, W.

11. The tube arrangement according to claim 1, comprising a first butt weld joint joining the first and second metal tubes at the first and second end regions, and a second butt weld joint joining the first and second sleeve parts.

12. The tube arrangement according to claim 11, wherein an annular space is formed between the first and second sleeve parts and the first and second metal tubes in an area of the first and second butt weld joints.

13. The tube arrangement according to claim 12, comprising a ceramic protection member arranged in the annular space.

14. A furnace comprising a chamber, a burner arrangement for generating heat, and a tube arrangement according to claim 1 for conducting a gas and/or steam through the furnace.

15. The furnace according to claim 14, wherein the furnace is configured for producing ethylene by cracking of hydrocarbons conducted through the tube arrangement.

16. A tube arrangement comprising a first metal tube, a second metal tube, a first sleeve part, and a second sleeve part, wherein a first end region of the first metal tube comprises a first outer threading and a second end region of the second metal tube comprises a second outer threading, wherein the first sleeve part is made of metal and comprises a first inner threading and the second sleeve part is made of metal and comprises a second inner threading, wherein the first end region is configured to be joined with the second end region via a first butt weld joint, wherein a first proximal sleeve end of the first sleeve part is configured to be joined with a second proximal sleeve end of the second sleeve part via a second butt weld joint, wherein the first sleeve part comprises a first outer surface extending at a first acute angle to an axial center axis of the first sleeve part and forming a first conical sleeve portion with its wide end at the first proximal sleeve end, and the second sleeve part comprises a second outer surface extending at a second acute angle to an axial center axis of the second sleeve part and forming a second conical sleeve portion with its wide end at the second proximal sleeve end, wherein the first end region comprises a first upset forged tube portion extending at least over an axial length of the first outer threading, and wherein the second end region comprises a second upset forged tube portion extending at least over an axial length of the second outer threading.

17. The tube arrangement according to claim 16, wherein each of the first and second metal tubes has a nominal diameter, Dnom, and a nominal cross sectional area, Anom, wherein the first sleeve part comprises a first distal sleeve end opposite to the first proximal sleeve end and the second sleeve part comprises a second distal sleeve end opposite to the second proximal sleeve end, wherein the first inner threading ends at a first threading end within a region of the first distal sleeve end, and the first sleeve part having a first threading end cross sectional area, A1, at the first threading end, wherein the second inner threading ends at a second threading end within a region of the second distal sleeve end, and the second sleeve part having a second threading end cross sectional area, A2, at the second threading end, wherein when the first and second proximal sleeve ends are joined by the second butt weld joint, at the second butt weld joint the first and second conical sleeve parts including the second butt well joint are configured to have a welding plane cross sectional area, Aweld, wherein a first length L1 extends between A1 and Aweld, and a second length L2 between A2 and Aweld, and wherein the first acute angle, and the second acute angle are formed by:

Aweld being within a range of 1.3-2.3 times Anom, each of A1 and A2 being within a range of 0.3-0.5 times Aweld, and each of L1 and L2 being within a range of 0.8-1.5 times Dnom.

18. The tube arrangement according to claim 16, wherein the first inner threading extends along at least a portion of the first conical sleeve portion, and wherein the second inner threading extends along at least a portion of the second conical sleeve portion.

19. The tube arrangement according to claim 16, wherein the first sleeve part comprises a first ring shaped portion at a first distal sleeve end of the first sleeve part opposite to the first proximal sleeve end, and wherein the second sleeve part comprises a second ring shaped portion at a second distal end of the second sleeve part opposite to the second proximal sleeve end.

20. The tube arrangement according to claim 19, wherein each of the first and second ring shaped portions has an inner diameter larger than an outer diameter of each of the first and second outer threadings, and wherein each of the first and second ring shaped portions has a planar inner surface.

21. The tube arrangement according to claim 16, wherein a cross sectional area of the first and second end regions at an inner diameter of each of the first and second outer threadings is at least 105%, or at least 110%, of a cross sectional area of each of the first and second metal tubes outside the first and second upset forged tube portions.

22. The tube arrangement according to claim 21, wherein the first upset forged tube portion comprises a first conical tube portion having an outer surface extending at an acute angle ($\gamma$) within a range of 2-10 degrees to an axial center axis of the first metal tube, and wherein the second upset forged tube portion comprises a second conical tube portion having an outer surface extending at an acute angle ($\delta$) within a range of 2-10 degrees to an axial center axis of the second metal tube.

23. The tube arrangement according to claim 22, wherein a transition from each of the first and second conical tube portions to a respective portion of the first and second metal tubes adjacent to the first and second upset forged tube portions has a radius of at least 5 mm.

24. The tube arrangement according to claim 16, wherein each of the first and second metal tubes has a wall thickness, W, wherein the first outer threading ends at a first distance, D1, from an end of the first metal tube at the first end region, wherein the first distance, D1, corresponds at least to the wall thickness, W, wherein the second outer threading ends at a second distance, D2, from an end of the second metal tube at the second end region, and wherein the second distance, D2, corresponds at least to the wall thickness, W.

25. The tube arrangement according to claim 16, comprising a first butt weld joint joining the first and second metal tubes at the first and second end regions, and a second butt weld joint joining the first and second sleeve parts.

26. The tube arrangement according to claim 25, wherein an annular space is formed between the first and second sleeve parts and the first and second metal tubes in an area of the first and second butt weld joints.

27. The tube arrangement according to claim 26, comprising a ceramic protection member arranged in the annular space.

28. The tube arrangement according to claim 16, wherein the first upset forged tube portion comprises a first conical tube portion having an outer surface extending at an acute angle ($\gamma$) within a range of 2-10 degrees to an axial center axis of the first metal tube, and wherein the second upset forged tube portion comprises a second conical tube portion having an outer surface extending at an acute angle ($\delta$) within a range of 2-10 degrees to an axial center axis of the second metal tube.

29. The tube arrangement according to claim 28, wherein a transition from each of the first and second conical tube portions to a respective portion of the first and second metal tubes adjacent to the first and second upset forged tube portions has a radius of at least 5 mm.

30. A furnace comprising a chamber, a burner arrangement for generating heat, and a tube arrangement according to claim 16 for conducting a gas and/or steam through the furnace.

31. The furnace according to claim 30, wherein the furnace is configured for producing ethylene by cracking of hydrocarbons conducted through the tube arrangement.

* * * * *